United States Patent [19]

Ghazizadeh

[11] Patent Number: 5,077,809
[45] Date of Patent: Dec. 31, 1991

[54] OPTICAL CHARACTER RECOGNITION

[76] Inventor: Farshad Ghazizadeh, 2267 Los Padres Blvd., No. B, Santa Clara, Calif. 95050

[21] Appl. No.: 358,955

[22] Filed: May 30, 1989

[51] Int. Cl.$^5$ .............................................. G06K 9/00
[52] U.S. Cl. ...................................... 382/33; 382/11; 382/37
[58] Field of Search ........................ 382/33, 11, 12, 34, 382/38, 57, 7, 37, 26

[56] References Cited

U.S. PATENT DOCUMENTS

| | | | |
|---|---|---|---|
| 3,200,373 | 8/1965 | Rabinow | 340/146.3 |
| 3,217,294 | 11/1965 | Gerlach et al. | 340/146.3 |
| 3,270,319 | 8/1966 | Schmid | 340/146.3 |
| 3,434,110 | 3/1969 | Bucklin et al. | 340/146.3 |
| 3,585,588 | 6/1971 | Hardin et al. | 340/146.3 |
| 3,588,822 | 6/1971 | Yamamoto | 382/11 |
| 3,644,889 | 2/1972 | Skenderoff et al. | 340/146.3 |
| 3,764,980 | 10/1973 | Dansac et al. | 340/146.3 |
| 3,903,503 | 9/1975 | Dillingham | 382/11 |
| 4,251,799 | 2/1987 | Jih | 340/146.3 |
| 4,675,909 | 6/1987 | Egami et al. | 382/50 |

OTHER PUBLICATIONS

R. G. Casey and C. R. Jih, "A Processor-Based OCR System", IBM Jour. Res. Develop., vol. 27 (Jul., 1981), pp. 386-399.
R. B. Hennis, "The IBM 1975 Optical Page Reader: Part I," IBM Jour. Res. Develop. (Sep., 1968), pp. 346-353.
M. R. Bartz, "The IBM 1975 Optical Page Reader: Part II," IBM Jour. Res. Develop. (Sep., 1968), pp. 354-363.
D. R. Andrews et al., "The IBM 1975 Optical Page Reader: Part III," IBM Jour. Res. Develop. (Sep., 1968), pp. 364-371.
B. Meng, "The Reading Edge," Macworld Magazine, Feb., 1989, pp. 170-179.

*Primary Examiner*—David K. Moore
*Assistant Examiner*—Yon Jung
*Attorney, Agent, or Firm*—Schneck & McHugh

[57] ABSTRACT

A technique for optical recognition of a designated character, which forms alternating dark and light bands from an analysis of as many as seven sub-regions of the character. Only the dark-and-light sequence of bands, not the relative or absolute sizes of these bands, is used to identify the character. The dark-and-light sequences found for the designated character are each compared with the corresponding sequences for a group of candidate characters available in a data base. Using a binary decision tree analysis, one or more candidate characters is identified whose sequences match the corresponding sequences for the designated character. If more than one candidate character is thus identified, any of seven additional processing techniques can be used to reduce the number of surviving candidate characters to a single character.

32 Claims, 6 Drawing Sheets

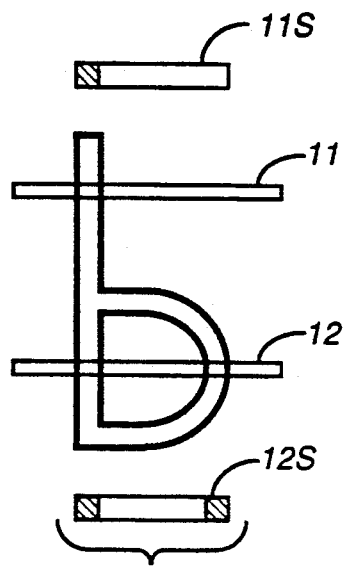
FIG._1A.
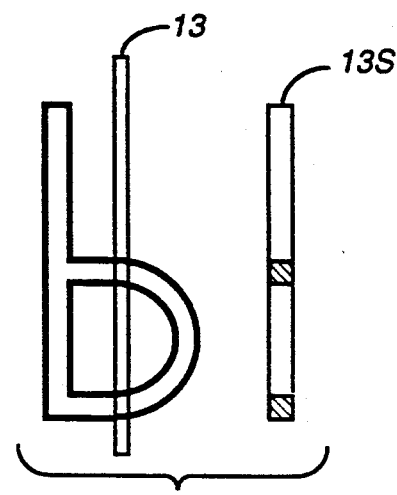
FIG._1B.
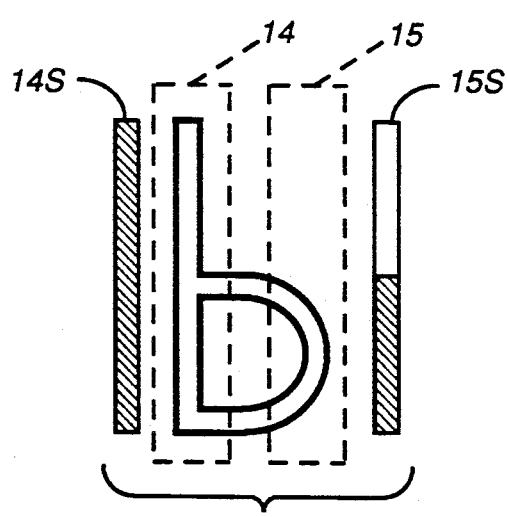
FIG._1C.
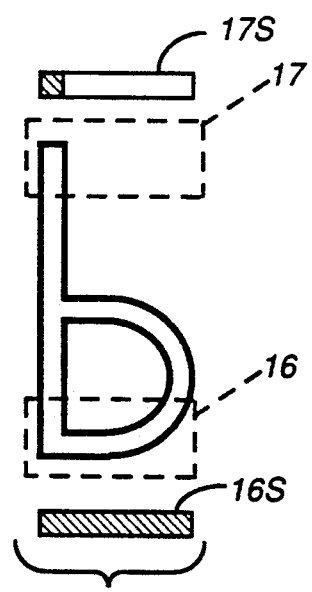
FIG._1D.

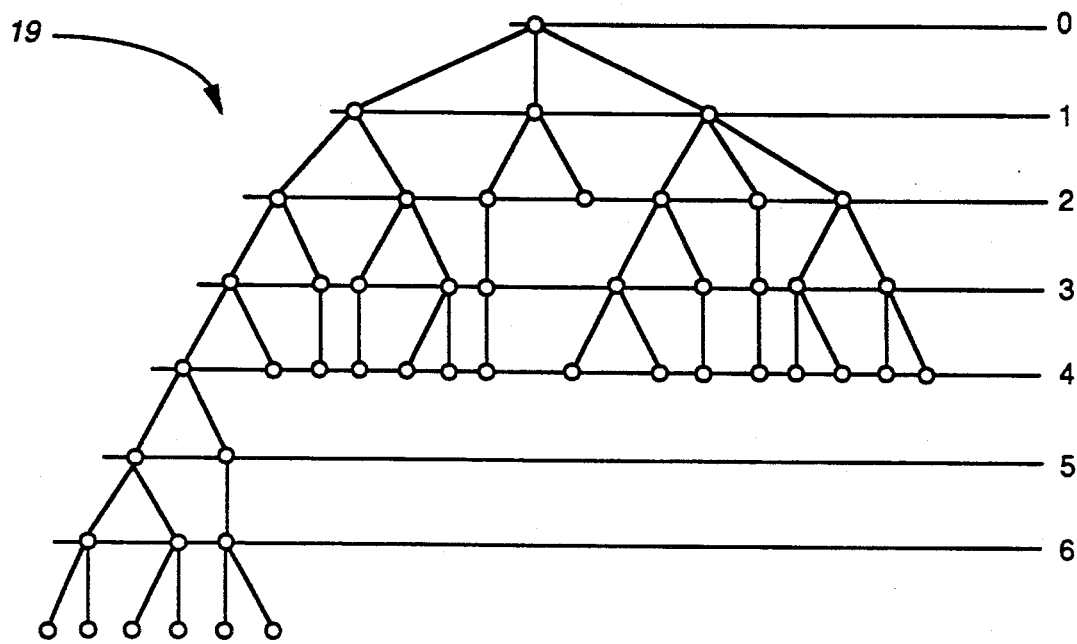
FIG._2.
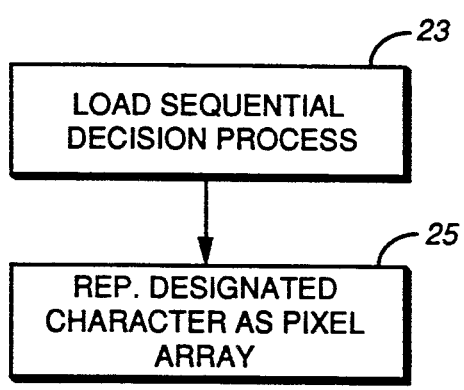
FIG._4.
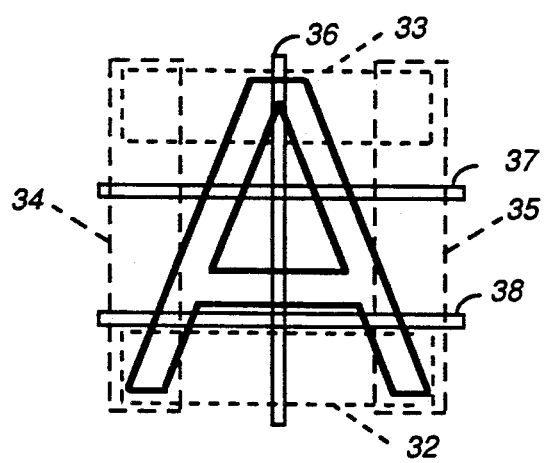
FIG._5.

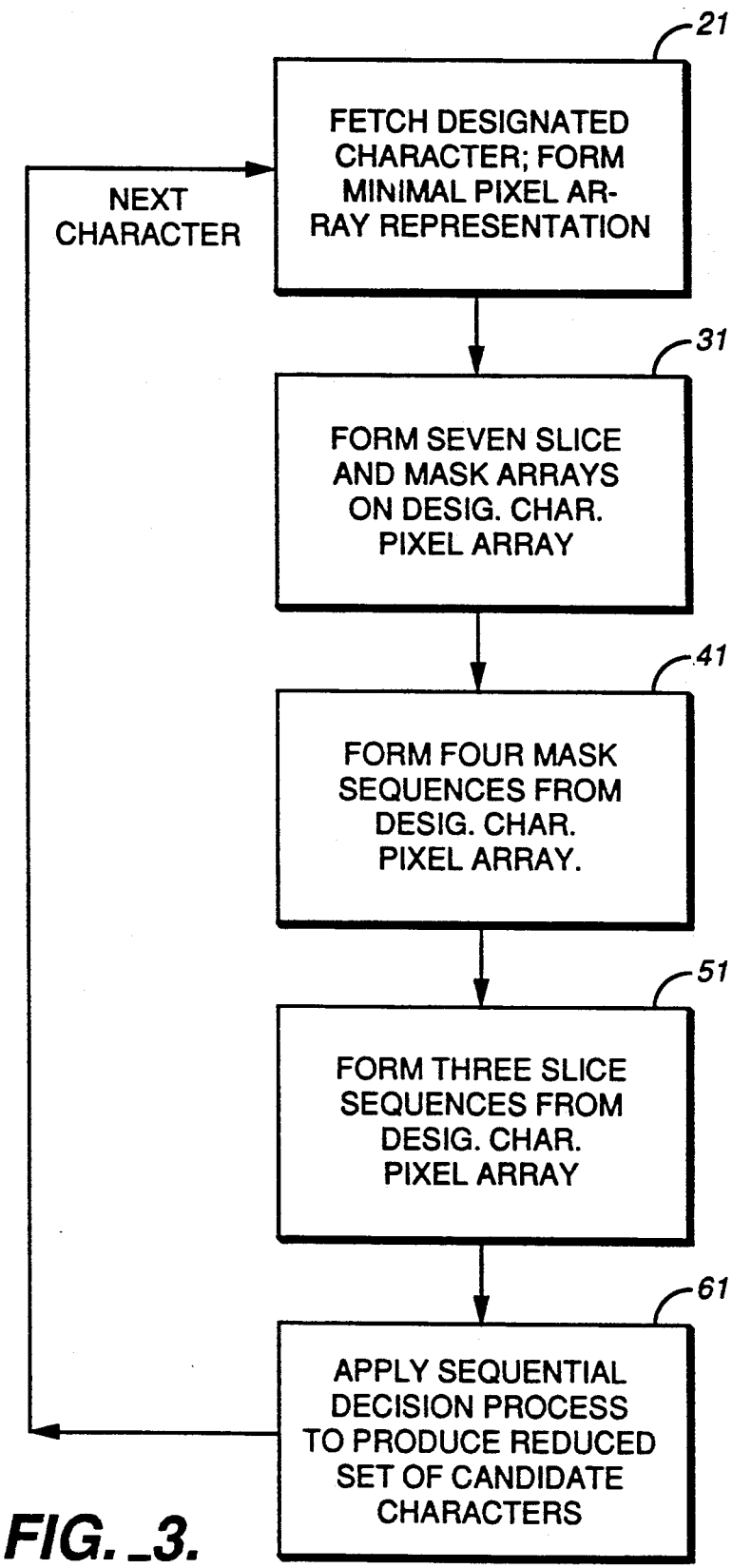
FIG. _3.

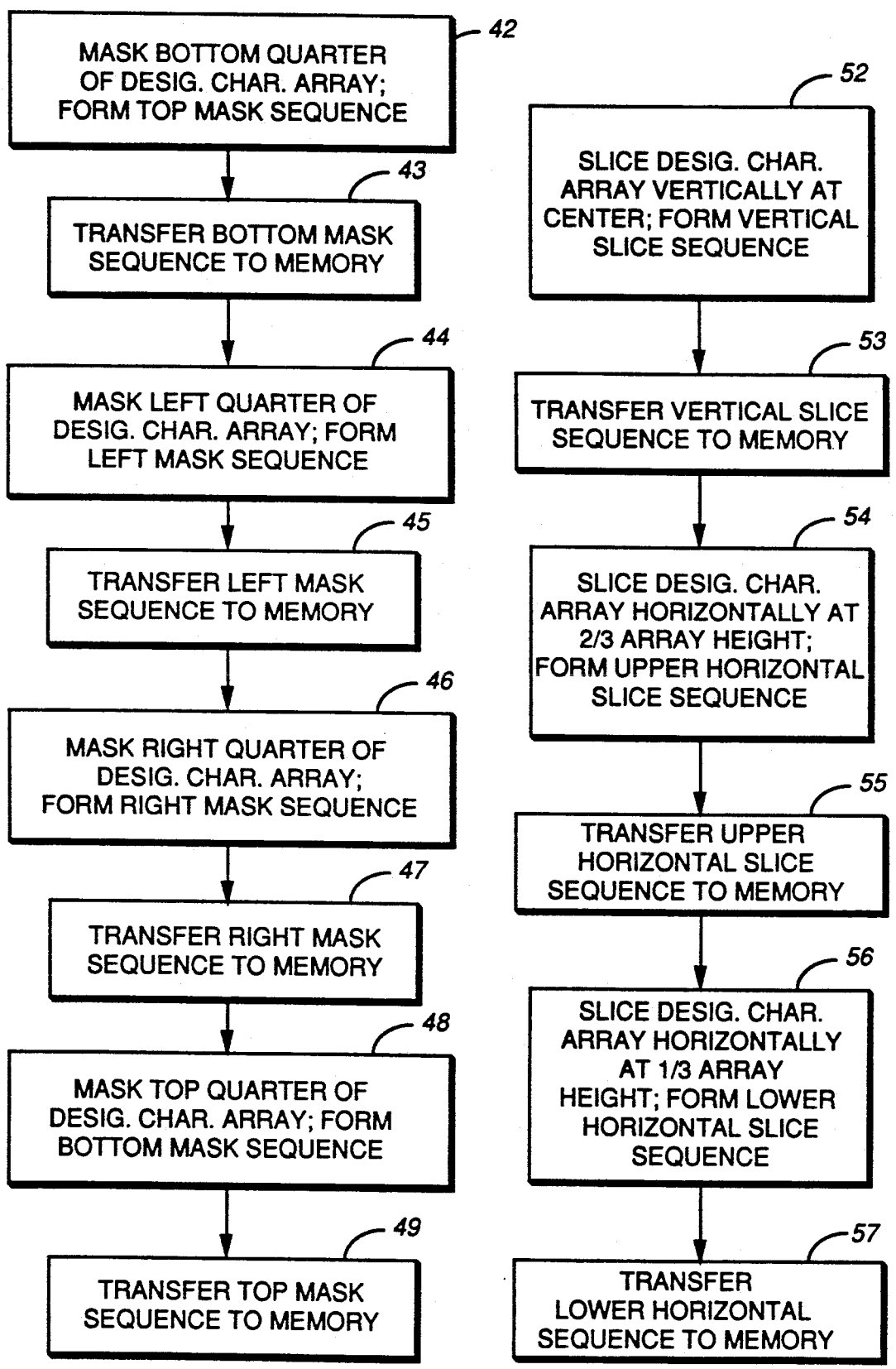
FIG._6.   FIG._7.

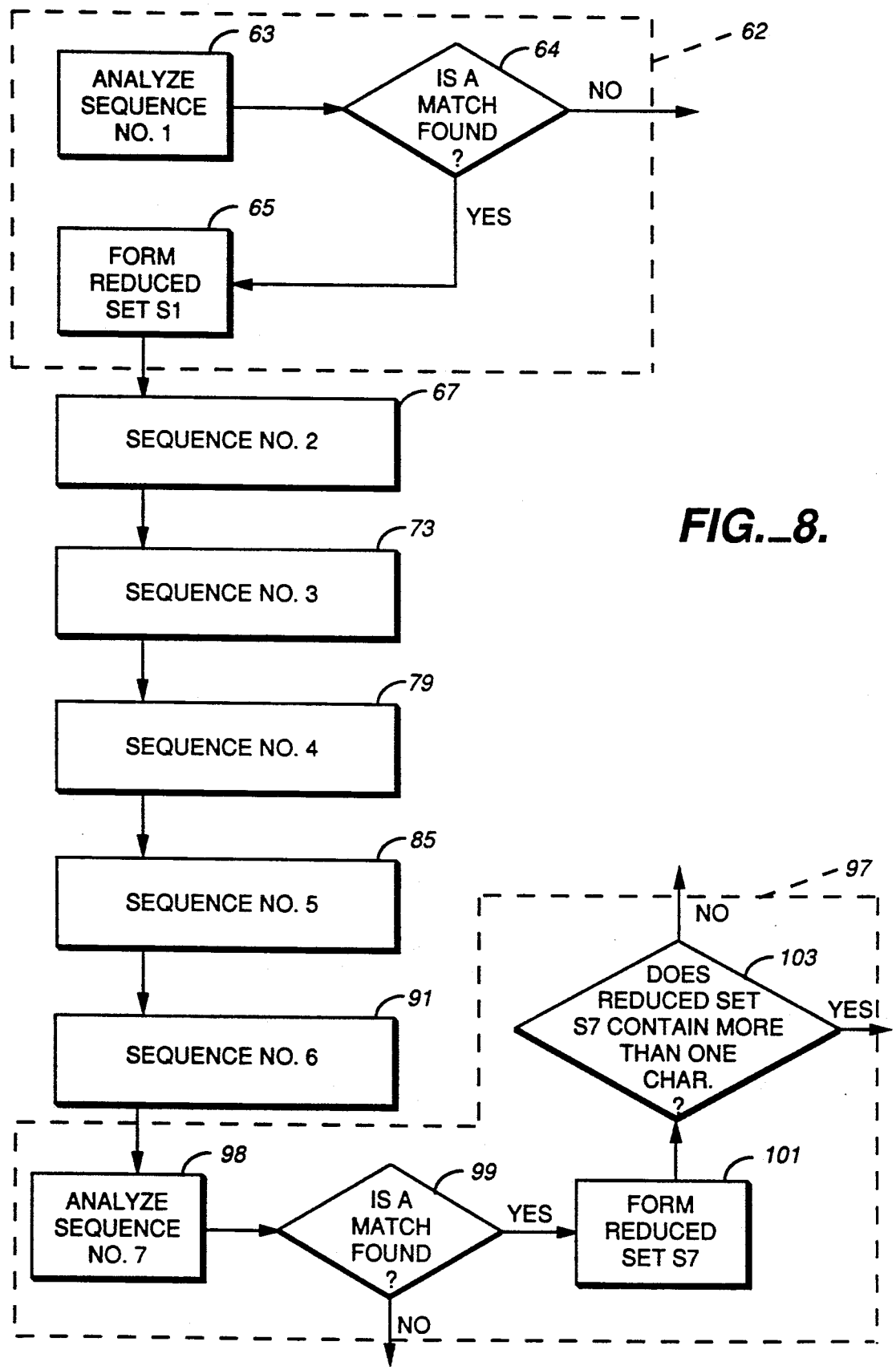
FIG._8.

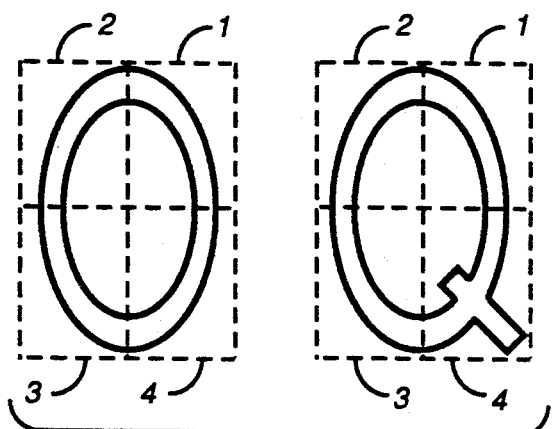
FIG._9.
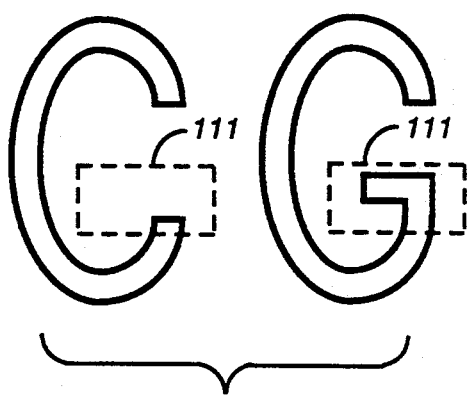
FIG._10.
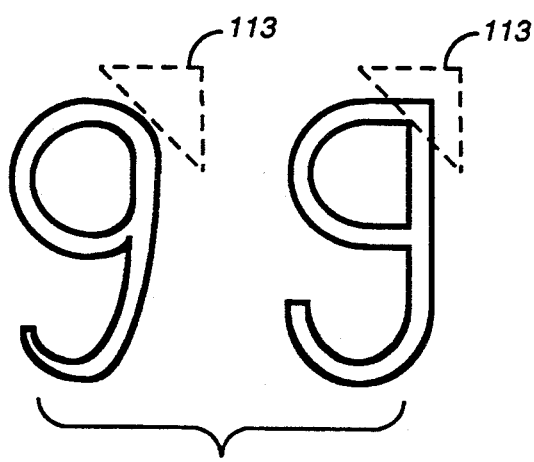
FIG._11.
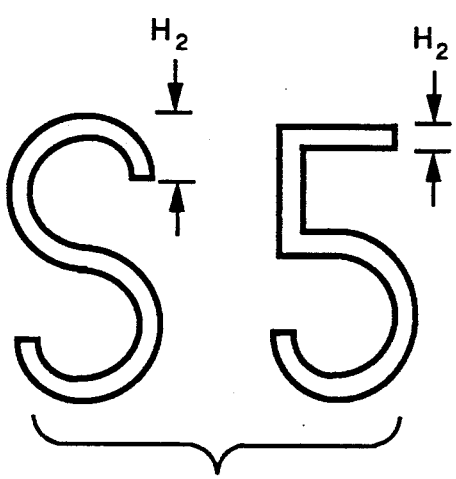
FIG._12.
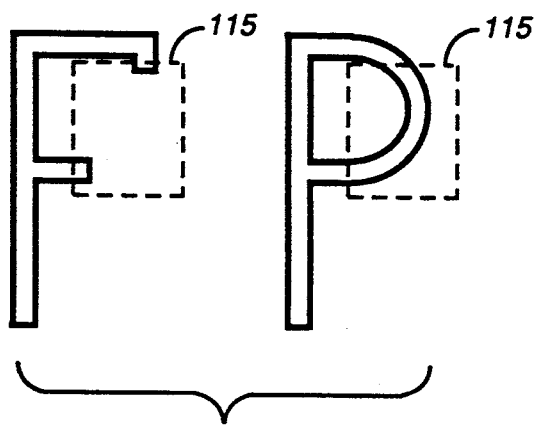
FIG._13.
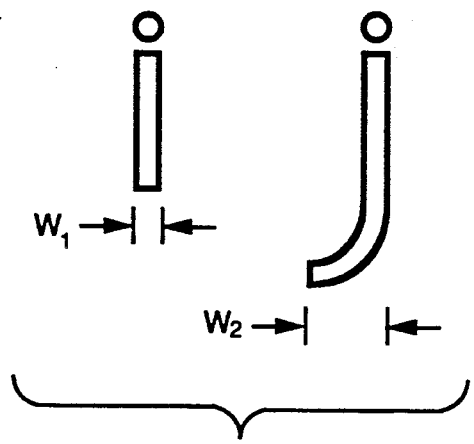
FIG._14.

OPTICAL CHARACTER RECOGNITION

TECHNICAL FIELD

This invention relates to optical recognition of individual characters that are scanned in a document or are entered from an image processing system.

BACKGROUND ART

Optical recognition of characters, such as letters, numerals and punctuation marks, in a text that is being scanned by a document scanner generally relies upon decomposition of a character into a set of small regions that comprise the character. Each of these regions is then analyzed in order to distinguish one character from all other characters. Analysis of these regions of a character often requires measurement of the relative widths of dark and light spaces that are part of the character when, say, the character is represented as a dark or blackened mark on a light background. This approach requires that absolute or relative measurements be made of the widths of the dark and light spaces and that these widths be numerically analyzed. Such an approach is time consuming and requires use of complex algorithms for such analysis.

A correlation approach is most commonly used, wherein the designated character to be recognized is overlaid on each of a set of candidate characters of similar size. The correlation function of the two characters is numerically computed, and the candidate character with the highest correlation number is then chosen as the designated character. This approach is also time consuming and requires many performances of a plurality of numerical computations for each designated character that is examined.

An example of the correlation function approach is U.S. Pat. No. 3,644,889, issued to Skenderoff et al. The patent discloses a character recognition system for alphanumeric characters using a minimum of three vertical slices and an unspecified number of horizontal slices through a character. A correlation function is constructed, using line segments and curves from the character being scanned and corresponding characteristic functions for each known character in the candidate set of characters. The Skenderoff et al. disclosure also distinguishes between families of ambiguous characters that cannot otherwise be distinguished through normal processing.

Other approaches to character recognition and identification do not use correlation functions. An example is U.S. Pat. No. 4,675,909, issued to Egami et al. The patent discloses an optical character recognition circuit that uses a number of linear slices through a character and determination of intersection of each such slice with a portion of the line segments and curves that make up the character being examined. The Egami et al. invention, as disclosed, appears to use four or more slices through a character and does not provide any post processing to remove any remaining ambiguities between characters.

Three related U.S. Patents, U.S. Pat. No. 3,217,294, issued to Gerlach et al., U.S. Pat. No. 3,270,319, issued to Schmid, and U.S. Pat. No. 3,434,110, issued to Bucklin et al., disclose the use of a character recognition system that relies upon five vertical slices through a character and two horizontal lines through a character. This produces a total of ten intersection regions at which each portion of the character is examined. The character set itself is preferably a stylized character set provided by the inventors rather than a character set in an arbitrary font. In the '294 patent, a five-bit sequence is generated for each of the two horizontal lines that intersect the five vertical spaces. These two sequences are compared with sequences for known characters in a logic matrix or circuit to attempt to identify the character that has been scanned. The '294, '319 and '110 patents also disclose use of error detection means and provide for rescanning a character if an error is detected, manifested receipt of two five-bit sequences of logical zeros and ones that do not match any character identified in the logic's matrix.

The disclosures of Skenderoff et al., Egami et al., Gerlach et al., Schmid and Bucklin et al. all appear to require information on the width or thickness of intersection of a given slice with a portion of the character under examination.

A supplementary scanner for character recognition is disclosed by Hardin et al. in U.S. Pat. No. 3,585,588. The supplementary scanner is activated after a conventional character scan has been performed, and only if the conventional scan has produced an ambiguity between two or more possible characters. The supplementary scan appears to require five additional scans of the ambiguous character. Two of the scans are vertical. One of the scans is horizontal. The remaining two scans are oriented at non-zero angles relative to the directions of vertical and horizontal scan. The numbers of intersections of two or more of these five scan lines with the ambiguous character are counted and used together with the conventional scan information to attempt to identify a character.

What is needed is a simple method for optical character recognition that can be performed in relatively few steps and that does not require measurement of absolute or relative widths of the dark and light spaces that characterize different portions of a character.

SUMMARY OF THE INVENTION

These needs are met by a character recognition method which determines dark and light bands or sequences for a designated, but unknown, character that are produced by making a series of at most seven slices through different portions of the character being examined. Simultaneously, masks are used on the character to test slices selected regions for distinguishing features. The character is represented as an assembly of dark or black linear and curvilinear segments superimposed on a light background. Each slice or mask produces a sequence of alternating dark and light bands that represents one small area of the character. The sequences of dark and light bands that are determined do not require specification of absolute or relative widths of the dark and light bands. Only the sequence itself, for example, dark, light, dark, light, need be prescribed.

A set of candidate characters is provided from a preestablished data base, one of which may be identified with the designated character. Each candidate character also has a corresponding set of slice and mask sequences, formed in the same manner as the sequences for the designated, unknown character. With these seven sequences in hand, a sequential decision process using a binary decision tree analysis is applied to identify the character. Each of the seven designated character sequences is compared with the corresponding sequence of each of the candidate characters. If the seven sequences of a candidate character uniquely agree with the corresponding seven sequences of the designated character, the designated character is identified with that candidate character. If more than one such candidate character satisfies these seven requirements so that an ambiguity exists, additional analytical techniques are provided to remove this ambiguity.

BRIEF DESCRIPTION OF THE DRAWINGS

FIGS. 1A-1D are diagrams illustrating three slicing processes and the four masking processes for the letter lower case "b", according to the invention.

FIG. 2 is a diagram of a sequential decision process or binary tree analysis according to the invention.

FIG. 3 presents a flow diagram of the main steps of the method for optical character recognition according to the invention.

FIG. 4 is a more detailed flow diagram of the process represented by the step 21 in FIG. 3.

FIG. 5 is a more detailed flow diagram of the process represented by the step 31 in FIG. 3.

FIG. 6 is a more detailed flow diagram of the process represented in step 41 of FIG. 3.

FIG. 7 is a more detailed flow diagram of the process represented in step 51 of FIG. 3.

FIG. 8 is a more detailed flow diagram of the process represented in step 61 of FIG. 3.

FIGS. 9-14 are diagrams illustrating regions of a pixel array where one of the additional processing techniques may be applied to distinguish between two or more characters that are not distinguished by the three slicing and four masking processes of the invention.

BEST MODE FOR CARRYING OUT THE INVENTION

With reference to FIGS. 1A-1D, the letter lower case "b" is used to demonstrate determination of light and dark bands that are used to identify the character according to the invention. It is assumed here that the designated character being examined is represented on a rectangular array of picture elements or pixels, as found in a CCD scanner. The character image is typically an assembly of dark colored pixels, representing the character itself, on a background of light colored pixels, or vice-versa. "Light" and "dark" refer to the existence of optical contrast between a character and the surrounding field, not to particular colors. Each designated character has been pre-processed by a segmentation analysis in order to separate and distinguish each character. The character segmentation process is well known, and examples of such processes are discussed by Casey and Jih in "A Processor-Based, OCR System." IBM J. Res. Develop., vol. 27, No. 4 (July, 1987), pp. 386-399, which is incorporated herein by reference.

The rectangular array used for representation is not fixed in size or position and will vary with the particular character examined. However, once the designated character is brought in and represented as a pixel array, the array is fixed for that character. For convenient reference, it is assumed here that a rectangular array R for a particular character examined is M pixels high by N pixels wide.

A first horizontally oriented slice 11 and a second horizontally oriented slice 12, each one or more pixels thick, are formed at the one-third height and two-thirds height, respectively, of the character, as shown in FIG. 1A. The first or upper horizontal slice through the character "b" produces a first sequence 11S of dark, light, reading from left to right. The second or lower horizontal slice produces a second sequence 12S of dark, light, dark. A vertical slice 13 through the character "b", shown in FIG. 1B, produces a third sequence 13S of light, dark, light, dark, reading from top to bottom.

In forming a slice sequence, an approximately rectangular sub-array R' of pixels, one or more pixels in thickness (height or width), is chosen from the rectangular array R that represent the image of the character. The sequence of dark and light bands of pixels in the sub-array R' yields a slice sequence of alternating dark and light bands, as shown in FIGS. 1A and 1B.

In FIG. 1C, a left mask 14 and a right mask 15 of the left-most quarter and right-most quarter of the letter "b" are determined. These are indicated immediately to the left and right, respectively, of the letter itself. The left mask sequence 14S and right mask sequence 15S produced by the masks in FIG. 1C are dark and light, dark respectively. FIG. 1D illustrates the sequences produced by a top mask and by a bottom mask. These are implemented by use of the upper-most quarter and the lower-most quarter of the letter under examination. For the letter "b" in FIG. 1D the top and bottom masks produce the sequences dark/light and dark, respectively.

In forming a left mask sequence, an approximately rectangular sub-array R" of pixels is formed from the array R that is approximately M pixels in height and approximately N/4 pixels in width and extends from the left boundary of the array R toward the right as shown in FIG. 1C. Beginning at the right boundary of the sub-array R" and looking leftward toward the left boundary of the sub-array R" along each horizontal line of pixels in R", that line is represented by a dark band if at least one pixel in that line in R" is a dark pixel. Otherwise, that line is represented by a light band. The left mask sequence is a concatenation of the sequence of dark and light bands produced by this procedure. In a similar manner, the right mask, top mask and bottom mask sequences are formed using the right quarter, the top quarter and the bottom quarter sub-arrays of the array R, respectively, as illustrated in FIGS. 1C and 1D. In FIG. 1D, the bottom mask 16 and top mask 17 produce a bottom mask sequence 16S and a top mask sequence 17S as indicated.

The seven mask and slice sequences for the letter "b" are found to be as follows, where "D" and "L" refer to a dark band and a light band, respectively, of length at least one pixel:

| | |
|---|---|
| bottom mask = | D |
| left mask = | D |
| right mask = | L,D |
| top mask = | D,L |
| vertical slice = | L,D,L,D |
| upper horiz. slice = | D,L |
| lower horiz. slice = | D,L,D |

In a similar manner, the seven mask and slice sequences are determined for each of the other characters in the set.

For completeness, the seven dark-and-light sequences for each of the letters and numerals are set down in Table 1, for a Helvetica font. For a fixed character, the seven dark-and-light sequences will vary with the font used. However, most of the seven sequences should be similar or identical for corresponding sequences of the same character, expressed in two different fonts.

TABLE 1

Mask and Slice Sequences for Letters and Numerals for a Helvetica Font.

| Character | Bottom Mask | Left Mask | Right Mask | Top Mask |
|---|---|---|---|---|
| A | D,L,D | L,D | L,D | L,D,L |
| a | D | D,L,D | D | D |
| B | D | D | D | D |
| b | D | D | L,D | D,L |
| C | D | D | D,L,D | D |
| c | D | D | D,L,D | D |
| D | D | D | D,L,D | D |
| d | D | L,D | D | L,D |
| E | D | D | D,L,D,L,D | D |
| e | D | D | D,L,D | D |
| F | D,L | D | D,L,D,L | D |
| f | D,L | D | D,L | L,D |
| G | D | D | D,L,D | D |
| g | D | D,L,D | D | D |
| H | D,L,D | D | D | D,L,D |
| h | D,L,D | D | L,D | D,L |
| I | L,D,L | D | D | D |
| i | L,D,L | D | D | D |
| J | D,L | D,L,D | D,L | D |
| j | D,L | L,D | D | D |
| K | D,L,D | D | D,L,D | D,L,D |
| k | D,L,D | D | L,D,L,D | D,L |
| L | D | D | L,D | D,L |
| l | L,D,L | D | D | D |
| M | D,L,D | D | D | D,L,D |
| m | D,L,D,L,D | D | D | D |
| N | D,L,D | D | D | D,L,D |
| n | D,L,D | D | D | D |
| O | D | D | D | D |
| o | D | D | D | D |
| P | D,L | D | D,L | D |
| p | D,L | D | D,L | D |
| Q | D,L | D | D,L,D | D |
| q | L,D | D,L | D | D |
| R | D,L,D | D | D | D |
| r | D,L | D | D,L | D |
| S | D | D,L,D | D,L,D | D |
| s | D | D,L,D | D,L,D | D |
| T | L,D,L | D,L | D,L | D |
| t | L,D | L,D,L | L,D,L,D | L,D,L |
| U | D | D | D | D,L,D |
| u | D | D | D | D,L,D |
| V | L,D,L | D,L | D,L | D,L,D |
| v | L,D,L | D,L | D,L | D,L,D |
| W | D,L,D | D,L | D | D,L,D,L,D |
| w | D,L,D | D,L | D,L | D,L,D,L,D |
| X | D,L,D | D,L,D | D,L,D | D,L,D |
| x | D,L,D | D,L,D | D,L,D | D,L,D |
| Y | L,D,L | D,L | D,L | D,L,D |
| y | L,D,L | D,L,D | D,L | D,L,D |
| Z | D | D,L,D | D,L,D | D |
| z | D | D,L,D | D,L,D | D |
| 1 | L,D,L | D,L,D | D | D |
| 2 | D | D,L,D | D,L,D | D |
| 3 | D | D,L,D | D | D |
| 4 | L,D,L | L,D,L | L,D,L | L,D,L |
| 5 | D | D,L,D | D,L,D | D |
| 6 | D | D | D,L,D | D |
| 7 | L,D,L | D,L | D,L | D |
| 8 | D | D | D | D |
| 9 | D | D,L,D | D | D |
| 0 | D | D | D | D |

| Character | Vertical Slice | Horizontal Slice No. 1 | Horizontal Slice No. 2 |
|---|---|---|---|
| A | D,L,D,L | L,D,L,D,L | L,D,L,D,L |
| a | D,L,D,L,D | D,L,D | D,L,D |
| B | D,L,D,L,D | D,L,D | D,L,D |
| b | L,D,L,D | D,L | D,L,D |
| C | D,L,D | D,L | D,L |
| c | D,L,D | D,L | D,L |
| D | D,L,D | D,L,D | D,L,D |
| d | L,D,L,D | L,D | D,L,D |
| E | D,L,D,L,D | D,L | D,L |
| e | D,L,D,L,D | D,L,D | D,L |
| F | D,L,D,L | D,L | D,L |
| f | D,L,D,L | D,L | D,L |

TABLE 1-continued

Mask and Slice Sequences for Letters and Numerals for a Helvetica Font.

| | | | |
|---|---|---|---|
| G | D,L,D,L,D | D,L | D,L,D |
| g | D,L,D,L,D | D,L,D | L,D |
| H | L,D,L | D,L,D | D,L,D |
| h | L,D,L | D,L | D,L,D |
| I | D | L,D,L | L,D,L |
| i | D,L,D | L,D,L | L,D,L |
| J | D | L,D,L | L,D,L |
| j | D,L,D | L,D,L | L,D,L |
| K | L,D,L | D,L,D,L | D,L,D,L |
| k | L,D,L | D,L,D,L | D,L,D,L |
| L | L,D | D,L | D,L |
| l | D | L,D,L | L,D,L |
| M | L,D,L | D,L,D,L,D,L,D | D,L,D |
| m | D | D,L,D,L,D | D,L,D,L,D |
| N | L,D,L | D,L,D,L,D | D,L,D,L,D |
| n | D,L | D,L,D | D,L,D |
| O | D,L,D | D,L,D | D,L,D |
| o | D,L,D | D,L,D | D,L,D |
| P | D,L,D,L | D,L,D | D,L |
| p | D,L,D,L | D,L,D | D,L |
| Q | D,L,D,L | D,L,D | D,L,D |
| q | D,L,D,L | D,L,D | L,D |
| R | D,L,D,L | D,L,D | D,L,D |
| r | D,L,D | L,D,L | D,L |
| S | D,L,D,L,D | D,L | D,L |
| s | D,L,D,L,D | D,L | D,L |
| T | D | L,D,L | L,D,L |
| t | D | L,D,L | L,D,L |
| U | L,D | D,L,D | D,L,D |
| u | L,D | D,L,D | D,L,D |
| V | L,D | D,L,D | D,L,D |
| v | L,D | D,L,D | D,L,D |
| W | L,D,L | D,L,D,L,D | L,D,L,D,L,D,L,D,L |
| w | L,D,L | D,L,D | L,D,L,D,L,D,L,D,L |
| X | L,D,L | L,D,L,D,L | L,D,L,D,L |
| x | L,D,L | L,D,L,D,L | L,D,L,D,L |
| Y | L,D | L,D,L,D,L | L,D,L,D,L |
| y | L,D | L,D,L,D,L | L,D,L,D,L |
| Z | D,L,D,L,D | L,D,L | L,D,L |
| z | D,L,D,L,D | L,D,L | L,D,L |
| 1 | D | L,D,L | L,D,L |
| 2 | D,L,D,L,D | L,D,L | L,D,L |
| 3 | D,L,D,L,D | L,D | L,D |
| 4 | L,D,L,D,L | L,D,L,D | D |
| 5 | D,L,D,L,D | D,L | L,D |
| 6 | D,L,D,L,D | D,L | D,L,D |
| 7 | L,D,D | L,D,L | L,D,L |
| 8 | D,L,D,L,D | D,L,D | D,L,D |
| 9 | D,L,D,L,D | D,L,D | L,D |
| 0 | D,L,D | D,L,D | D,L,D |

The schematic representation of a sequential decision process or binary decision tree analysis of FIG. 2 identifies the character being examined in seven levels of analysis. Any order of the seven levels may be chosen so that the number of different, but equivalent, processes here is 7!=5040. At level 0, an approximately rectangular array R of minimal size is constructed for the designated character. The seven mask and slice sequences for all candidate characters are made available for comparison with the corresponding seven sequences for the designated character. The decision tree 19 has seven levels, numbered 1-7, if each of the two horizontal slices is examined separately. Alternatively, the tree 19 may have six levels if the two horizontal slice sequences are examined together. The order chosen here for purposes of illustration is (1) bottom mask sequence, (2) left mask sequence, (3) right mask sequence, (4) top mask sequence, (5) vertical slice sequence, (6) upper horizontal slice sequence and (7) lower horizontal slice sequence. Alternatively, the analyses at levels 6 and 7 can be combined. When the system reaches level 7, all seven sequence comparisons have been made and, ideally, precisely one candidate character remains that has satisfied the constraints imposed at all the preceding levels 1-7.

EXAMPLE

The lower case "b" character is again chosen for illustration. In level 1, the bottom mask sequence is examined for the set of all candidate characters, denoted $S_O$. Only a reduced set $S_1$ $S_O$ of candidate characters have a first sequence of D. For the lower case "b" character, the set $S_1$ includes the members a, B, b, C, c, D, d, E, e, G, g, L, O, o, S, s, U, u, Z, z, 2, 3, 5, 6, 8, 9 and 0. At level 2, the left mask sequence D for the designated character is compared with the left mask sequence of each character in the first reduced set $S_1$. This produces a second reduced set $S_2$ $S_1$ of candidate characters whose left mask sequence is D. The reduced set $S_2$ for the character "b" is a smaller set and includes only the members B, b, C, D, E, e, G, L, O, o, U, u, 6, 8 and 0. At level 3, the right mask sequence L, D for the designated character is compared with the right mask sequence for each candidate character in the set $S_2$; and this procedure produces a reduced set $S_3$ $S_2$ whose right mask sequence is also L, D. The set $S_3$ includes only the characters "b" and "L". In a similar manner, at level 4 the top mask sequence D, L for the designated character is compared with the top mask sequence for each character in the set $S_3$; and this produces a reduced set $S_4$ $S_3$, where $S_4$ includes only the same characters, "b" and "L", as does $S_3$. At the fifth level of analysis, the vertical slice sequence L, D, L, D of the designated character "b" is compared with the vertical slice sequence for each character in the set $S_4$; and this produces a reduced set $S_5$ $S_4$, where $S_5$ includes only the character "b". In a similar manner, at levels 6 and 7 the reduced sets $S_6$ $S_5$ and $S_7$ $S_6$ are constructed, and each set includes only the character "b". In this sequential analysis for the character "b", only five levels of analysis were required to identify the designated character. More generally, from one to seven levels of analysis would be required to identify the designated character. The number of levels required to identify a given designated character may differ from one font to another. For a fixed, but unknown, designated character, the reduced set $S_7$ should be the same for any permutation of the order of examination of the seven mask and slice sequences, because any character in the set $S_7$ satisfies all seven of the constraints imposed by the mask and slice sequences of the designated character.

It may occur that one of the reduced sets $S_i$ ($i=1, 2, \ldots, 7$) is empty and contains no characters. If this occurs, the normal procedure fails, the binary decision tree analysis is terminated at the first stage for which an empty set occurs, and the operator is notified of this event. Ideally, the set $S_7$ contains only one character, either a letter or a numeral, and the system identifies this character with the designated character that was scanned for analysis. It may also occur that the set $S_7$ contains more than one character. In this event, further analysis is necessary; but this further analysis focuses upon specific subregions of the character that allow one to distinguish between the two or more characters that are contained in the set $S_7$. This is discussed below.

PROCEDURE

The flow diagram of FIG. 3 indicates the major steps in the identification of a character. In the first step 21, the image of the character, expressed in pixel form, is fetched and made ready for analysis. An approximately rectangular array R of minimal size of pixels is circumscribed about the designated character so that the sequences of dark and light bands can be generated. In step 31, the seven mask and slice regions on the rectangular array R that delineate the seven sequences are determined. In step 41, the bottom mask, left mask, right mask and top mask are used to generate the bottom mask sequence, left mask sequence, right mask sequence and top mask sequence, respectively, for the character being examined. In step 51, the vertical slice and the two horizontal slices are each used to generate a slice sequence for the designated character under examination. In step 61, the binary decision tree analysis is applied to the seven sequences to produce a final reduced set $S_7$ that, it is expected, holds one or more characters whose seven sequences satisfy all seven of the constraints imposed by the seven mask and slice sequences for the designated character.

FIG. 4 is a more detailed flow diagram of the first step 21 in FIG. 3. The binary decision tree to be used to analysis is loaded into memory in step 23, and the character to be examined is brought into a separate memory location in which the character itself is represented as a minimal array R of pixels, with each pixel having only two pixel color values, dark or light. The size of the rectangular array R of pixels used to represent a letter or numeral is not important here, but the size $36 \times 28$ will be used for purposes of illustration.

A more detailed illustration of the step 31, shown in FIG. 3, of marking the pixel locations on the character image that will be used for masking and slicing, is illustrated in FIG. 5 as applied to the upper case "A" character. The bottom mask 32 and top mask 33 will occupy the nine bottom-most rows of pixels and the nine top-most rows of pixels, respectively, for the $36 \times 28$ pixel array. The left mask 34 and right mask 35 will occupy the seven left-most columns of pixels and the right-most columns of pixels, respectively for the pixel array. The vertical slice 36 will occupy one or more pixel columns including or adjacent to column No. 14 (or, alternatively, pixel column No. 15). The upper horizontal slice 37 and lower horizontal slice 38 will occupy one or more adjacent pixel rows including or adjacent to row No. 12 (or No. 13) and including or adjacent to row No. 24 (or No. 25), respectively. Each mask includes a rectangular sub-array of approximately one-fourth of the pixels in the character array R, and each slice includes a column or a row of pixels in the array R that is one or more pixels in thickness.

FIG. 6 is a detailed flow diagram of the step 41 in FIG. 3 of applying each of the four masks to the boundaries of the designated character. In step 42 of FIG. 6, the bottom mask is applied, and the dark and light sequence is determined for the bottom mask applied to the character being examined. If this is applied to the upper case character "A", the bottom mask sequence would be dark, light, dark, as may be determined from FIG. 5. In step 43, the bottom mask sequence for the designated character thus determined is transferred to a first sequence location in memory. Note that the width or height or size of each of the dark and light bands in the sequence is not determined here, only the sequence itself. In step 44, the left mask is applied to the character and the left mask sequence for the designated character is determined; and this sequence is transferred to the second sequence location in memory in step 45. The right mask is applied to the character in step 46 and the right mask sequence for the designated character is determined; and this sequence is transferred to a third sequence location in memory in step 47. The top mask is applied to the character in step 48 and the top mask sequence for the designated character is determined; and this sequence is transferred to a fourth sequence location in memory in step 49. It may be verified from Table 1 and from inspection of FIG. 5 that, for the upper case character "A", these four sequences become, respectively: (1) dark, light, dark; (2) light, dark; (3) light, dark; and (4) light, dark, light.

FIG. 7 sets forth a more detailed flow diagram of the step 51 in FIG. 3 for determining the three slice sequences for the designated character being examined. In step 52 of FIG. 7, the vertical slice is applied to the character, and a vertical slice sequence for the designated character is determined; and in step 53 this sequence is transferred to a fifth sequence location in memory. In step 54, the upper or first horizontal slice is applied to the character, and a first horizontal slice sequence for the designated character is determined; and this sequence is transferred to a sixth sequence location in memory in step 55. In step 56, the lower or second horizontal slice is applied to the character, and a second horizontal slice sequence for the designated character is determined; and this sequence is transferred to a seventh sequence location in memory in step 57. It may be verified by reference to Table 1 and inspection of FIG. 5 that, for the upper case character "A", this produces the following three slice sequences, respectively: (1) dark, light, dark, light; (2) light, dark, light, dark, light; and (3) light, dark, light, dark, light.

Table 2 sets forth the sequences of dark and light bands that are presented for each of the seven masks and slices analyzed in FIGS. 6 and 7. An "x" at a particular table entry position indicates that the dark-light sequence for that column appears for at least one character for the mask or slice indicated by the row in which the "x" appears. For example, the sequence dark, light, dark, light appears only for the top mask, vertical slice and upper horizontal slice sequences; and the sequence light, dark, light, dark, light, dark appears only for the vertical slice sequence. From Table 2, note that four of the twelve sequences of dark and light bands shown there appear in all seven of the mask and slice sequences for the candidate set of characters.

TABLE 2

| Dark-Light Sequences in the Candidate Set. | | | | | | | |
|---|---|---|---|---|---|---|---|
| Sequence | D | D,L | L,D | D,L,D | L,D,L | D,L,D,L | L,D,L,D |
| Bottom mask | x | x | x | x | x | | |
| Left mask | x | x | x | x | x | | |
| Right mask | x | x | x | x | x | | x |
| Top mask | x | x | x | x | x | x | |
| Vertical slice | x | x | x | x | x | x | x |
| Upper horiz. slice | | x | x | x | x | x | |
| Lower horiz. slice | | x | x | x | x | | |

| Sequence | D,L,D,L,D | L,D,L,D,L | Others |
|---|---|---|---|
| Bottom mask | x | | |
| Left mask | | | |

TABLE 2-continued

| Dark-Light Sequences in the Candidate Set. | | | |
|---|---|---|---|
| Right mask | x | | |
| Top mask | x | | |
| Vertical slice | x | x | D,L,D,L,D,L |
| Upper horiz. slice | x | x | D,L,D,L,D,L,D |
| Lower horiz. slice | x | x | L,D,L,D,L,D,L |

FIG. 8 presents a more detailed flow diagram of the step 61 in FIG. 3 of the application of the sequential decision process for binary tree analysis to the seven mask and slice sequences for the designated character that are stored in memory.

In step 63 of FIG. 8, the first sequence for the designated character is brought in from memory and analyzed by reference to Table 2 or an equivalent table. If this first sequence corresponds to a bottom mask for the character, the designated character sequence should be one of the following: (1) dark; (2) dark, light; (3) light, dark; (4) dark, light, dark; (5) light, dark, light; or (6) dark, light, dark, light, dark. If the first designated character sequence matches one of these six sequences, as in step 64, the decision process proceeds to step 65, where the original set of all candidate characters is reduced to a first subset $S_1$ that contains only characters for which the first sequence, for example, the bottom mask sequence, matches the first designated character sequence brought in from memory. If no match is found at step 64, which would occur if the sequence brought in from memory is not one of the six bottom mask sequences shown in the first row(s) of Table 2, a no-match signal is generated and sent elsewhere.

Assuming that a match is found at step 64, the second designated character sequence is brought in from memory in step 67 and analyzed according to the entries in Table 2 or an equivalent table. This second sequence should coincide with one of the eight left mask sequences shown in the second row(s) of Table 2. If a match is found at this step, the analysis proceeds to the next step and a reduced set $S_2$ is formed. The set $S_2$ consists of all candidate characters in the set $S_1$ that also produce a second sequence that matches the second designated sequence brought in from memory. If a match is not found, a no-match signal is generated and sent elsewhere. Proceeding in this manner, the remaining steps 73, 79, 85, 91 and 97 shown in FIG. 8 are performed sequentially as shown. Block 97 includes several steps, including the seventh sequence analysis block 98. At each of the levels n=1-7 of FIG. 2, one of the seven designated character sequences is brought in from memory and is compared with the sequences available for the corresponding mask or slice sequence, as indicated in Table 2 or an equivalent table. Query block 99 looks for a match. If a match is found, a reduced set $S_n$ is formed from the set of all characters present in the set $S_{n-1}$ that also produce a match at level n, represented by block 101, and the analysis proceeds to the next level. If matches are found at all seven steps, the result of this analysis is a reduced set $S_7$ that contains one or more candidate characters that satisfy the constraints imposed by each of the seven designated character sequences brought in from memory, represented by query block 103, indicating a determination of whether one or more exists.

Alternatively, the analysis illustrated in FIG. 8 may be implemented by forming seven sets $T_1, T_2, \ldots, T_7$, where each set $T_i$ contains the set of all candidate characters with one mask sequence or slice sequence that agrees with the corresponding mask or slice sequence for the designated character. The final set T is the intersection of the seven sets $T_1, T_2, \ldots, T_7$; T coincides with the set $S_7$. If the set $S_7$ contains only one character, the foregoing analysis has identified the designated character that was scanned, based upon the seven sequences for the character that were earlier generated.

As noted above, in some instances it may be possible to identify a character with fewer than seven levels of analysis. For example, with reference to Tables 1 and 2, horizontal slice No. 2, taken for the upper case "X" or lower case "x" character, produces the sequence light, dark, light, dark, light. Only the two characters "X" and "x" produce this sequence so that if this designated character sequence is present the character can be identified as either "X" or "x" with a single sequence comparison, namely horizontal slice sequence No. 2. Certain characters can thus be identified with as few as one, two, three or four levels of sequence analysis. However, it may be preferable to perform all seven levels of sequence analysis for each character in order to provide a uniform analysis of the characters being scanned into the system.

If a no-match signal is generated at one of the seven levels shown in FIGS. 2 or 8, the operator is notified of this and the pixel representation of the character is stored for subsequent individual analysis, with the location of this character in the sequence of levels of analysis being also noted for future reference. Alternatively, if the no-match signal occurs at level n, this level may be skipped and the reduced set $S_{n-1}$ may be used to continue the analysis for the levels $n+1, \ldots, 7$. This would produce a modified reduced set $S_7'$; and the reduced number of characters in the set $S_{n-1}'$ could then be used to determine the character from the sequence information provided at levels 1-7 in FIG. 2, excluding level n, and possibly from a visual examination of the pixel representation of the character.

If the reduced set $S_7$ contains more than one character, additional analysis is required as noted above in order to remove the ambiguity and identify the particular character that is present. Normally, if the set $S_7$ contains more than one character it will contain two such characters, for example, the characters "9" and "g". Table 3 sets forth the pairs and triplets of characters for which ambiguities are possible after application of the seven-level analysis illustrated in FIG. 8. At this point it is necessary to examine particular regions of the character under examination, with reference to the particular pair or triplet of candidate characters in the set $S_7$. That is, the particular regions of the character under examination that are focused upon are determined by the particular pair or triplet of candidate characters in the set $S_7$.

Table 3 lists n-tuples (n=2,3,4,5) for which ambiguity is possible for one or more of the many type fonts that have been analyzed using the seven-level sequence of masks and slices discussed above. Note that most of the pairs, triplets, quadruplets and quintuplets are not ambiguous for the Helvetica font analyzed in Table 1. However, for more elaborate fonts such as Courier, Titan and Century Schoolbook, many more ambiguities can appear.

TABLE 3

| Ambiguous Character Groups | |
|---|---|
| B,8 | Q,8 |
| C,c,G,8 | S,s,5 |
| C,G | U,u |
| D,O,o,Q,0 | V,v |
| F,f,P,p | W,w |
| g,q,9 | X,x |
| H,M | Y,y |
| I,J,1,l(one) | Z,z,2 |
| i,j | S,8 |
| K,k | |

To be sure, not all characters will require this further analysis, and many can be identified by the seven-level analysis illustrated in FIG. 8. However, the additional analysis is provided for those pairs, triplets, quadruplets and quintuplets ("multiplets") of characters that cannot be distinguished by the seven-level analysis. FIGS. 9-13 illustrate some of the sub-regions of the designated character array R that are examined in distinguishing candidate characters for one or more of the multiplets of characters that survive the seven-level analysis.

Where the set $S_7$ contains two or more candidate characters, additional processing techniques are applied to remove or reduce the ambiguity and identify the designated character. At least seven techniques are available for such purpose, but only one or a few of these will be applied for a given designated character. Further the techniques applied will vary according to the candidate characters remaining in the set $S_7$. A first technique counts and the number of dark pixels in one or more specific quadrants or other small region of the array R for the character and compares the counts.

The upper case characters "O" and "Q" may produce the same seven mask and slice sequences. FIG. 9 illustrates the "O" and "Q" characters in one font, where the array R representing each of these letters is decomposed into four quadrants 1, 2, 3 and 4 as shown. If the first and fourth quadrants of the upper case letter "O" are compared, the number of dark pixels in these two quadrants is the same, or nearly so. However, the number of dark pixels in the first and fourth quadrants for the upper case letter "Q" are quite different, because of the diagonal stroke in the fourth quadrant for "Q". Thus, if the ambiguous character set $S_7$ contains the characters "O" and "Q", inter alia, one of these characters can be deleted by counting and comparing the number of pixels in the first and fourth quadrants of the array R for the designated character. This approach will also allow distinguishment: between the upper case letters "I" and "J", using the second and third quadrants; between the upper case letter "I" and the lower case letter "l", using the first and second quadrants; between the upper case letter "J" and the lower case letter "l", using the third and fourth quadrants; between the upper case letters "C" and "G", using a right central region that includes the horizontal bar on the "G" character, as illustrated in FIG. 10; between the upper case letter "D" and any of the characters "O", "o", "Q" and "0", using the first and second quadrants; and between the characters "Q" and "8", using the first and fourth quadrants. The numeral "1" is more easily distinguished from the letters "I", "J" and "l" using the Context Technique discussed below. This technique may be referred to as the Pixel Counting Technique.

A second technique uses the absence of dark pixels in a specified region for one candidate character and the presence of one or more dark pixels in that region for another candidate character. An example is the pair of characters "g" and "9" shown in FIG. 11. The character "g" has several dark pixels in a small triangular region 113 in the upper right corner of the array R in FIG. 11, but the character "9" has none in that region. Other multiplets of characters for which this distinction exists include "Z" versus "2" (triangular area in upper right corner or upper left corner); "S" versus "5" (triangular area in upper left corner); "K" versus "k" (triangular are in upper right corner); "B" versus "8" (triangular areas in upper left corner or lower left corner); "F" versus "f" (triangular area in upper left corner); "D" versus "0" (triangular area in upper left corner); "D" versus "Q" (triangular area in upper left corner); and "b" versus "6" (triangular areas in upper left corner or lower left corner). This technique may be referred to as the Pixel Absence Technique.

A third technique uses distinctions in the height of a dark pixel band at the top or bottom boundary of a character. An example is the distinction between "S" and "5", illustrated in FIG. 12. In quadrant 1 for these two characters, the height, measured in pixels from the top of the character downward, of a continuous band of dark pixels is $h_1$ for the character "S" and $h_2$ for the character "5". The bond height $h_2$ for the numeral "5" is approximately uniform in the first quadrant, whereas the height $h_1$ for the letters "S" and "s" may decrease rapidly from a maximum value $(h_1)_{max} >> (h_2)_{max}$ to a much smaller value in the first quadrant. Other pairs of characters for which this distinction exists include: "F" versus "f" (quadrant 1); "F" versus "P" (quadrant 1); and "I" versus "J" (quadrant 3). This technique may be referred to as the Component Height Technique.

A fourth technique uses distinctions in the width of a dark pixel band at the right or left boundary of a character. The upper case letters "C" and "G" can be distinguished by determining the width w in pixels in quadrant 4, extended, if necessary, to include the horizontal bar on the character "G". This technique may be referred to as the Component Width Technique.

A fifth technique uses location of a break or discontinuity in an otherwise-continuous dark pixel band, which band need not be horizontally or vertically oriented. With reference to the characters "F" and "P" shown in FIG. 13, a break in dark pixel band continuity occurs in the interior of the upper right quadrant 115 in "F" but not in "P". Another pair of characters to which this distinction is applicable is "S" (or "s") versus "8", using quadrant 1 or quadrant 3. This technique may be referred to as the Pixel Discontinuity Technique.

A sixth technique uses differences in maximum width of a character. This is illustrated in FIG. 13, where the width $w_1$ of the character "i" is much less than the width $w_2$ of the character "j". This technique may be referred to as the Character Width Technique.

A seventh technique uses distinctions based on the context in which a character appears. This is especially useful in distinguishing between upper and lower case representations of the same letter such as the letter pairs (C,c), (F,f), (K,k), (O,o), (P,p), (S,s), (U,u), (V,v), (W,w), (X,x), (Y,y) and (Z,z), collection of pairs which is called the twins family here. The choice of upper or lower case for the letter is determined by the position and case of any letters that appear in the same word as the designated character. For example, in the word "This" or "this", the letters "h" and "i" that precede the designated character "s" are both lower case so that it is likely that this character is the lower case "s" rather than the upper case "S". In this situation, the method would identify the designated character as the upper case letter "S" in preference to the lower case letter "s". However, if the word appears as "THIS", where the three letters preceding the designated character are all upper case, it is likely that the designated character is the upper case "S." Another example is the word "Port" or "port", where the appearance of lower case "r" and "t" in the same word following the designated character indicates that the designated character is the lower case "o" rather than the upper case "O". This technique will not work for a word such as "cuff", "pox" or "soy" because all letters of such word belong to the twins family.

This seventh technique may also be used to distinguish between candidate character pairs that include a letter and a numeral such as (I,1), (z,2), (B,3), (s,5), (s,6), (B,8), (g,9) and (o,0). If the designated character appears in a word that otherwise contains only letters, it is likely that the designated character is a letter and the apparatus would identify the designated character as a letter. If the designated character appears in a word that otherwise contains only numerals, it is likely that the designated character is a numeral and the method would identify the designated character as a numeral. If the designated character is either a letter or a numeral and appears in a word of length one (i.e., one isolated character), it is more likely that the designated character is a numeral. This seventh technique may be referred to as the Context Technique.

The character pairs used as examples in illustrating the seven additional processing techniques above may be distinguishable using the seven mask and slice sequences for one font but not for another font. Thus, the use of a character pair in the examples illustrating any of the seven additional processing techniques above should not be taken to imply that the technique must be used for that character pair in any font; nor should the absence of a character pair in the example be taken to imply that the technique cannot be used to distinguish that character pair in another font. The seven mask and slice sequences and the seven additional processing techniques discussed above have been successfully applied to recognition of, and distinction between, upper and lower case letters, numerals, and punctuation marks.

The number of horizontal slices, shown as two in FIGS. 1A and 5, may be reduced to one such slice, positioned at the one-third height (38 in FIG. 5), at the two-thirds height (37 in FIG. 5), or at some other suitable height. This choice will increase the number of ambiguous character sets to which the above-described seven additional processing techniques are applied to remove the remaining ambiguities. The increase, if any, in the number of ambiguous character sets will depend upon the font used for the characters. If a single horizontal slice is used at the one-third height or two-thirds height, Table 1 will still provide the mask and slice sequences for the letters and numerals for a Helvetica font, with one of the last two columns in Table 1 being deleted. Corresponding changes would be made in the mask and slice sequences for other fonts.

I claim:

1. A method for recognition of a designated character by an optical scanner comprising the steps of:

providing an array R of pixels of minimal size, the array containing the designated character therein;

providing three pixel slices across the array at three predetermined positions, one of which is oriented at right angles to the other two slices, to produce first, second and third slice sequences of alternating bands of dark and light pixels for the designated character;

providing four pixel masks, to determine first, second, third and fourth mask sequences of alternating bands of dark and light pixels at peripheral regions of the pixel array for the designated character;

providing a candidate set of characters, each candidate character being characterized by first, second and third slice light and dark sequences and first, second, third and fourth mask light and dark sequences that correspond, respectively, to the first, second and third slice sequences and the first, second, third and fourth mask sequences for the designated character;

forming an identification set of all characters in the candidate set whose slice sequences and mask sequences agree with the slice sequences and mask sequences for the designated character; and identifying a character in the identification set as the designated character.

2. The method of claim 1, wherein said candidate set comprises all upper case letters, all lower case letters and all numerals in a font.

3. The method of claim 1, wherein said candidate set further comprises at least one punctuation mark.

4. The method of claim 1, wherein said four peripheral regions of said pixel array are adjacent to the top boundary of said array, the left boundary of said array, the bottom boundary of said array and the right boundary of said array.

5. The method of claim 1, wherein said step of forming said identification set comprises the steps of:

forming first, second and third sets of said candidate characters that comprise all candidate characters whose first, second and third slice sequences agree, respectively, with said corresponding first, second and third slice sequences of said designated character;

forming fourth, fifth, sixth and seventh sets of said candidate characters that comprise all candidate characters whose first, second, third and fourth mask sequences agree, respectively, with said corresponding first, second, third and fourth mask sequences for said designated character; and forming the intersection of the first, second, third, fourth, fifth, sixth and seventh sets and identifying this intersection set with said identification set.

6. The method of claim 1, wherein said step of forming said identification set comprises the steps of:

defining a set S0 of all said candidate characters;

for said first, second, third and fourth mask sequences numbered $j=1,2,3$ and 4, respectively, of said designated character and said candidate characters, defining a set Sj ($j=1,2,3,4$) of all said candidate characters c for which (i) c belongs to the set $S(j-1)$ and (ii) said mask sequence No. j for the character c is identical to said mask sequence No. j for said designated character;

for said first, second and third slice sequences numbered $j=5,6$ and 7, respectively, of said designated character and said candidate characters, defining a set Sj ($j=5,6,7$) of all said candidate characters c' for which (i) c' belongs to the set $S(j-1)$ and (ii) said slice sequence No. j for the character c' is identical to said slice sequence No. j for said designated character; and identifying the set S7 with said identification set.

7. The method of claim 1, wherein said step of forming said identification set comprises the steps of:

defining a set S0 of all said candidate characters;

for said first, second and third slice sequences numbered $j=1,2$ and 3, respectively, of said designated character and said candidate characters, defining a set Sj ($j=1,2,3$) of all said candidate characters c for which (i) c belongs to the set $S(j-1)$ and (ii) said slice sequence No. j for the character c is identical to said slice sequence No. j for said designated character;

for said first, second, third and fourth mask sequences numbered $j=4,5,6$ and 7, respectively, of said designated character and said candidate characters, defining a set Sj ($j=4,5,6,7$) of all said candidate characters c' for which (i) c' belongs to the set $S(j-1)$ and (ii) said mask sequence No. j for the character c' is identical to said mask sequence No. j for said designated character; and identifying the set S7 with said identification set.

8. The method of claim 1, further comprising the steps of:

representing each character in said identification set as an array of dark and light pixels;

for each character in said identification set, identifying a common sub-region SR in the pixel array representation for which (i) said identification set contains at least two identification characters and (ii) the sub-region SR for one identification character contains a substantially different fraction of dark pixels than the fraction of dark pixels contained in the sub-region SR for a second identification character;

determining the number of dark pixels in the sub-region SR of said array R of pixels that represents said designated character;

comparing the number of dark pixels in the sub-region SR of said designated character, the first identification character and the second identification character; and identifying said designated character with the first identification character or with the second identification character, according as the number of dark pixels in the sub-region SR for said designated character is closer to the first identification character or to the second identification character, respectively.

9. The method of claim 1, further comprising the steps of:

representing each character in said identification set as an array of dark and light pixels;

for each character in said identification set, identifying a first common sub-region SR1 and a second common sub-region SR2 in the pixel array representation for which (i) said identification set contains at least two identification characters and (ii) the sub-regions SR and SR2 for a first identification character contain approximately the same number of dark pixels, and the sub-regions SR1 and SR2 for a second identification character contain substantially different numbers of dark pixels;

determining the number of dark pixels in the sub-regions SR1 and SR2 of said array R of pixels that represents said designated character;

comparing the number of dark pixels in the sub-regions SR1 and SR2 of said designated character; and identifying said designated character with the first identification character or with the second identification character, according as the number of dark pixels in the sub-regions SR1 and SR2 for said designated character are approximately the same or are substantially different, respectively.

10. The method of claim 1, further comprising the steps of:

representing each character in said identification set as an array of dark and light pixels;

for each character in said identification set, identifying a common sub-region SR in the pixel array representation for which (i) said identification set contains at least two identification characters and (ii) the sub-region SR for a first identification character contains no dark pixels therein and contains a plurality of dark pixels therein for a second identification character;

determining the number of dark pixels contained in the sub-region SR of said array of pixels R that represents said designated character;

identifying said designated character with the first identification character or with the second identification character, according as the number of dark pixels in the sub-region SR of said designated character is zero or greater than zero, respectively.

11. The method of claim 1, further comprising the steps of:

representing each character in said identification set as an array of dark and light pixels;

for each character in said identification set, identifying a common sub-region SR in the pixel array representation for which (i) said identification set contains at least two identification characters and (ii) within the sub-region SR, a first identification character has a continuous band of dark pixels whose vertical height is substantially different from the vertical height of a continuous band of dark pixels for a second identification character;

determining the vertical height of a continuous band of dark pixels contained in the sub-region SR of said array R of pixels that represents said designated character; and identifying said designated character with the first identification character or with the second identification character, according as the vertical height of the continuous dark pixel band of said designated character is closer to the vertical height of the continuous dark pixel band of the first identification character or the second identification character.

12. The method of claim 1, further comprising the steps of:

representing each character in said identification set as an array of dark and light pixels;

for each character in said identification set, identifying a common sub-region SR in the pixel array representation for which (i) said identification set contains at least two identification characters and (ii) within the sub-region SR, a first identification character has a continuous band of dark pixels whose horizontal width is substantially different from the horizontal width of a continuous band of dark pixels for a second identification character;

determining the horizontal width of a continuous band of dark pixels contained in the sub-region SR of said array R of pixels that represents said designated character; and identifying said designated character with the first identification character or with the second identification character, according as the horizontal width of the continuous dark pixel band of said designated character is closer to the horizontal width of the continuous dark pixel band of the first identification character or the second identification character.

13. The method of claim 1, further comprising the steps of:

representing each character in said identification set as an array of dark and light pixels;

for each character in said identification set, identifying a common sub-region SR in the pixel array representation for which (i) said identification set contains at least two identification characters and (ii) within the interior of the sub-region SR, a first identification character is represented as a single, continuous band of dark pixels and a second identification character is represented as two or more continuous bands of dark pixels that are spaced apart from each other within the sub-region SR;

determining whether said designated character within the interior of the sub-array SR is represented as a single, continuous band of dark pixels; and identifying said designated character with the first identification character if said designated character is represented within the interior of the sub-array SR as a single, continuous band of dark pixels, and identifying said designated character with the second identification character if said designated character is not so represented.

14. The method of claim 1, further comprising the steps of:

representing each character in said identification set as an array of dark and light pixels;

for each character in said identification set, determining the horizontal width in pixels of the character;

determining the horizontal width in pixels of said designated character; and identifying a character in said identification set with said designated character if the horizontal width of the character in said identification set differs by at most one pixel from the horizontal width of said designated character.

15. The method of claim 1, wherein said identification set for said designated character contains an upper case character and a lower case character for the same letter, said designated character is part of a word comprising at least three letters, and the method further comprises the steps of:

determining whether at least one other character in the word that includes said designated character is a lower case letter;

identifying said designated character with a lower case letter in said identification set, if at least one other character in the word that contains said designated character is a lower case letter; and identifying said designated character with an upper case letter in said identification set, if no other character in the word that contains said designated character is a lower case letter.

16. The method of claim 1, wherein said identification set for said designated number contains a letter and a numeral, said designated character is part of a word comprising at least one character in addition to said designated character, and the method further comprises the steps of:
- determining whether at least one other character in the word that includes said designated character is a numeral;
- identifying said designated character with a numeral in said identification set, if at least one other character in the word that contains said designated character is a numeral; and
- identifying said designated character with a numeral in said identification set, if no other character in the word that contains said designated character is a numeral.

17. A method for recognition of a designated character by an optical scanner comprising the steps of:
- providing an approximately rectangular array R of pixels of minimal size representing the designated character, the array being M pixels in height by N pixels in width;
- providing a bottom mask of pixels that is an approximately rectangular sub-array of the array R, approximately N pixels in width and approximately M/4 pixels in height, that extends upward from the bottom of the array R;
- forming a bottom mask sequence from the intersection of the bottom mask with the designated character in the array R;
- providing a left mask of pixels that is approximately a rectangular sub-array of the array R, approximately M pixels in height and approximately N/4 pixels in width, that extends rightward from the left side of the array R;
- forming a left mask sequence from the intersection of the left mask with the designated character in the array R;
- providing a right mask of pixels that is an approximately rectangular sub-array of the array R, approximately M pixels in height and approximately N/4 pixels in width, that extends leftward from the right side of the array R;
- forming a right mask sequence from the intersection of the right mask with the designated character in the array R;
- providing a top mask of pixels that is an approximately rectangular sub-array of the array R, approximately N pixels in width and approximately M/4 pixels in height, that extends downward from the top of the array R;
- forming a top mask sequence from the intersection of the top mask with the designated character in the array R;
- providing a vertical slice of pixels that is an approximately rectangular sub-array of the array R, at least one pixel in width, extending from the top of the array R to the bottom of the array R at a position approximately equidistant from the two sides of the array R;
- forming a vertical slice sequence from the intersection of the vertical slice with the designated character in the array R;
- providing a first horizontal slice of pixels that is an approximately rectangular sub-array of the array R, at least one pixel in height, extending from the left side of the array R to the right side of the array R at a position approximately M/3 pixels from the bottom of the array R;
- forming a first horizontal slice sequence from the intersection of the first horizontal slice with the designated character in the array R;
- providing a second horizontal slice of pixels that is an approximately horizontal sub-array of the array R, at least one pixel in height, extending from the left side of the array R to the right side of the array R at a position approximately M/3 pixels from the top of the array R;
- forming a second horizontal slice sequence from the intersection of the second horizontal slice with the designated character in the array R;
- providing a candidate set of characters, each represented by an array of dark and light pixels and, for each such candidate character, providing a bottom mask sequence, a left mask sequence, a right mask sequence, a top mask sequence, a vertical slice sequence, a first horizontal slice sequence and a second horizontal slice sequence as the corresponding sequence is formed for the designated character;
- determining a first subset of the candidate set of characters, each character of which has a bottom mask sequence that agrees with the bottom mask sequence of the designated character;
- determining a second subset of the candidate set of characters, each character of which has a left mask sequence that agrees with the left mask sequence of the designated character;
- determining a third subset of the candidate set of characters, each character of which has a right mask sequence that agrees with the right mask sequence of the designated character;
- determining a fourth subset of the candidate set of characters, each character of which has a top mask sequence that agrees with the top mask sequence of the designated character;
- determining a fifth subset of the candidate set of characters, each character of which has a vertical slice sequence that agrees with the vertical slice sequence of the designated character;
- determining a sixth subset of the candidate set of characters, each character of which has a first horizontal slice sequence that agrees with the first horizontal slice sequence of the designated character;
- determining a seventh subset of the candidate set of characters, each character of which has a second horizontal slice sequence that agrees with the second horizontal slice sequence of the designated character;
- determining an identification set of characters that belong to all of the first, second, third, fourth, fifth, sixth and seventh subsets of the candidate set of characters; and
- identifying a character in the identification set as the designated character.

18. The method of claim 17, wherein said candidate set comprises all upper case letters, all lower case letters and all numerals.

19. The method of claim 18, wherein said candidate set further comprises at least one punctuation mark.

20. The method of claim 17, further comprising the steps of:

representing each character in said identification set as an array of dark and light pixels;

for each character in said identification set, identifying a common sub-region SR in the pixel array representation for which (i) said identification set contains at least two identification characters and (ii) the sub-region SR for one identification character contains a substantially different fraction of dark pixels than the fraction of dark pixels contained in the sub-region SR for a second identification character;

determining the number of dark pixels in the sub-region SR of said array R of pixels that represents said designated character;

comparing the number of dark pixels in the sub-region SR of said designated character, the first identification character and the second identification character; and identifying said designated character with the first identification character or with the second identification character, according as the number of dark pixels in the sub-region SR for said designated character is closer to the first identification character or to the second identification character, respectively.

21. The method of claim 17, further comprising the steps of:

representing each character in said identification set as an array of dark and light pixels;

for each character in said identification set, identifying a first common sub-region SR1 and a second common sub-region SR2 in the pixel array representation for which (i) said identification set contains at least two identification characters and (ii) the sub-regions SR and SR2 for a first identification character contain approximately the same number of dark pixels, and the sub-regions SR1 and SR2 for a second identification character contain substantially different numbers of dark pixels;

determining the number of dark pixels in the sub-regions SR1 and SR2 of said array R of pixels that represents said designated character;

comparing the number of dark pixels in the sub-regions SR1 and SR2 of said designated character; and identifying said designated character with the first identification character or with the second identification character, according as the number of dark pixels in the sub-regions SR1 and SR2 for said designated character are approximately the same or are substantially different, respectively.

22. The method of claim 17, further comprising the steps of:

representing each character in said identification set as an array of dark and light pixels;

for each character in said identification set, identifying a common sub-region SR in the pixel array representation for which (i) said identification set contains at least two identification characters and (ii) the sub-region SR for a first identification character contains no dark pixels therein and contains a plurality of dark pixels therein for a second identification character;

determining the number of dark pixels contained in the sub-region SR of said array of pixels R that represents said designated character;

identifying said designated character with the first identification character or with the second identification character, according as the number of dark pixels in the sub-region SR of said designated character is zero or greater than zero, respectively.

23. The method of claim 17, further comprising the steps of:

representing each character in said identification set as an array of dark and light pixels;

for each character in said identification set, identifying a common sub-region SR in the pixel array representation for which (i) said identification set contains at least two identification characters and (ii) within the sub-region SR, a first identification character has a continuous band of dark pixels whose vertical height is substantially different from the vertical height of a continuous band of dark pixels for a second identification character;

determining the vertical height of a continuous band of dark pixels contained in the sub-region SR of said array R of pixels that represents said designated character; and identifying said designated character with the first identification character or with the second identification character, according as the vertical height of the continuous dark pixel band of said designated character is closer to the vertical height of the continuous dark pixel band of the first identification character or the second identification character.

24. The method of claim 17, further comprising the steps of:

representing each character in said identification set as an array of dark and light pixels;

for each character in said identification set, identifying a common sub-region SR in the pixel array representation for which (i) said identification set contains at least two identification characters and (ii) within the sub-region SR, a first identification character has a continuous band of dark pixels whose horizontal width is substantially different from the horizontal width of a continuous band of dark pixels for a second identification character;

determining the horizontal width of a continuous band of dark pixels contained in the sub-region SR of said array R of pixels that represents said designated character; and identifying said designated character with the first identification character or with the second identification character, according as the horizontal width of the continuous dark pixel band of said designated character is closer to the horizontal width of the continuous dark pixel band of the first identification character or the second identification character.

25. The method of claim 17, further comprising the steps of:

representing each character in said identification set as an array of dark and light pixels;

for each character in said identification set, identifying a common sub-region SR in the pixel array representation for which (i) said identification set contains at least two identification characters and (ii) within the interior of the sub-region SR, a first identification character is represented as a single, continuous band of dark pixels and a second identification character is represented as two or more continuous bands of dark pixels that are spaced apart from each other within the sub-region SR;

determining whether said designated character within the interior of the sub-array SR is represented as a single, continuous band of dark pixels; and identifying said designated character with the first identification character if said designated character is represented within the interior of the sub-array SR as a single, continuous band of dark pixels, and identifying said designated character with the second identification character if said designated character is not so represented.

26. The method of claim 17, further comprising the steps of:

representing each character in said identification set as an array of dark and light pixels;

for each character in said identification set, determining the horizontal width in pixels of the character;

determining the horizontal width in pixels of said designated character; and identifying a character in said identification set with said designated character if the horizontal width of the character in said identification set differs by at most one pixel from the horizontal width of said designated character.

27. The method of claim 17, wherein said identification set for said designated character contains an upper case character and a lower case character for the same letter, said designated character is part of a word comprising at least three letters, and the method further comprises the steps of:

determining whether at least one other character in the word that includes said designated character is a lower case letter;

identifying said designated character with a lower case letter in said identification set, if at least one other character in the word that contains said designated character is a lower case letter; and identifying said designated character with an upper case letter in said identification set, if no other character in the word that contains said designated character is a lower case letter.

28. The method of claim 17, wherein said identification set for said designated number contains a letter and a numeral, said designated character is part of a word comprising at least one character in addition to said designated character, and the method further comprises the steps of:

determining whether at least one other character in the word that includes said designated character is a numeral;

identifying said designated character with a numeral in said identification set, if at least one other character in the word that contains said designated character is a numeral; and identifying said designated character with a letter in said identification set, if no other character in the word that contains said designated character is a numeral.

29. A method for recognition of a designated character by an optical scanner comprising the steps of:

providing an array R of pixels of minimal size, the array containing the designated character therein;

providing two pixel slices across the array at two predetermined positions, one slice being oriented at right angles to the other slices, to produce first and second slice sequences of alternating bands of dark and light pixels for the designated character;

providing four pixel masks, to determine first, second, third and fourth mask sequences of alternating bands of dark and light pixels at peripheral regions of the pixel array for the designated character;

providing a candidate set of characters, each candidate character being characterized by first and second slice light and dark sequences and first, second, third and fourth mask light and dark sequences that correspond, respectively, to the first, second and third slice sequences and the first, second, third and fourth mask sequences for the designated character;

forming an identification set of all characters in the candidate set whose slice sequences and mask sequences agree with the slice sequences and mask sequences for the designated character; and identifying a character in the identification set as the designated character.

30. A method for recognition of a designated character by an optical scanner comprising the steps of:

providing an approximately rectangular array R of pixels of minimal size representing the designated character, the array being M pixels in height by N pixels in width;

providing a bottom mask of pixels that is an approximately rectangular sub-array of the array R, approximately N pixels in width and approximately M/4 pixels in height, that extends upward from the bottom of the array R;

forming a bottom mask sequence from the intersection of the bottom mask with the designated character in the array R;

providing a left mask of pixels that is approximately a rectangular sub-array of the array R, approximately M pixels in height and approximately N/4 pixels in width, that extends rightward from the left side of the array R;

forming a left mask sequence from the intersection of the left mask with the designated character in the array R;

providing a right mask of pixels that is an approximately rectangular sub-array of the array R, approximately M pixels in height and approximately N/4 pixels in width, that extends leftward from the right side of the array R;

forming a right mask sequence from the intersection of the right mask with the designated character in the array R;

providing a top mask of pixels that is an approximately rectangular sub-array of the array R, approximately N pixels in width and approximately M/4 pixels in height, that extends downward from the top of the array R;

forming a top mask sequence from the intersection of the top mask with the designated character in the array R;

providing a vertical slice of pixels that is an approximately rectangular sub-array of the array R, at least one pixel in width, extending from the top of the array R to the bottom of the array R at a position approximately equidistant from the two sides of the array R;

forming a vertical slice sequence from the intersection of the vertical slice with the designated character in the array R;

providing a horizontal slice of pixels that is an approximately rectangular sub-array of the array R, at least one pixel in height, extending from the left side of the array R to the right side of the array R at a position that is a predetermined number of pixels from the bottom of the array R;

forming a horizontal slice sequence from the intersection of the horizontal slice with the designated character in the array R;

providing a candidate set of characters, each represented by an array of dark and light pixels and, for each such candidate character, providing a bottom mask sequence, a left mask sequence, a right mask sequence, a top mask sequence, a vertical slice sequence and a horizontal slice sequence as the corresponding sequence is formed for the designated character;

determining a first subset of the candidate set of characters, each character of which has a bottom mask sequence that agrees with the bottom mask sequence of the designated character;

determining a second subset of the candidate set of characters, each character of which has a left mask sequence that agrees with the left mask sequence of the designated character;

determining a third subset of the candidate set of characters, each character of which has a right mask sequence that agrees with the right mask sequence of the designated character;

determining a fourth subset of the candidate set of characters, each character of which has a top mask sequence that agrees with the top mask sequence of the designated character;

determining a fifth subset of the candidate set of characters, each character of which has a vertical slice sequence that agrees with the vertical slice sequence of the designated character;

determining a sixth subset of the candidate set of characters, each character of which has a horizontal slice sequence that agrees with the horizontal slice sequence of the designated character;

determining an identification set of characters that belong to all of the first, second, third, fourth, fifth and sixth subsets of the candidate set of characters; and identifying a character in the identification set as the designated character.

31. The method of claim 30, further comprising the step of choosing said position of said horizontal slice sequence as approximately M/3 pixels above said bottom of said array R.

32. The method of claim 30, further comprising the step of choosing said position of said horizontal slice sequence as approximately M/3 pixels below said top of said array R.

* * * * *

UNITED STATES PATENT AND TRADEMARK OFFICE
CERTIFICATE OF CORRECTION

PATENT NO. : 5,077,809
DATED : December 31, 1991
INVENTOR(S) : Farshad Ghazizadeh It is certified that error appears in the above-identified patent and that said Letters Patent is hereby corrected as shown below:

Column 2, line 11, "manifested receipt" should read
    -- manifested by receipt --.

Column 2, line 48, "test slices selected" should read
    -- test selected --.

Column 7, line 9, "$S_1S_0$" should read -- $S_1CS_0$ --;

line 16, "$S_2S_1$" should read -- $S_2CS_1$ --;

line 23, "$S_3S_2$" should read -- $S_3CS_2$ --;

line 29, "$S_4S_3$" should read -- $S_4CS_3$ --;

line 34, "$S_5S_4$" should read -- $S_5CS_4$ --;

line 36, "$S_6S_5$ and $S_7S_6$" should read -- $S_6CS_5$ and $S_7CS_6$ --

Signed and Sealed this

Twenty-seventh Day of April, 1993

*Attest:*

MICHAEL K. KIRK

*Attesting Officer*     *Acting Commissioner of Patents and Trademarks*